United States Patent [19]

Mernøe

[11] 3,998,319
[45] Dec. 21, 1976

[54] CONVEYOR LINE BETWEEN TWO WORKING STATIONS FOR OBJECTS SUCH AS BOTTLES

[75] Inventor: Erik Christian Mernøe, Virum, Denmark

[73] Assignee: De Forenede Bryggerier A/S, Copenhagen, Denmark

[22] Filed: Feb. 10, 1975

[21] Appl. No.: 548,856

[30] Foreign Application Priority Data

Feb. 13, 1974 Denmark .......................... 748/74

[52] U.S. Cl. .......................... 198/347; 198/453; 198/572; 198/577
[51] Int. Cl.² .......................... B65G 43/08
[58] Field of Search .......................... 198/30, 32, 37, 40, 198/76, 19, 24, 45

[56] References Cited

UNITED STATES PATENTS

| | | | |
|---|---|---|---|
| 2,936,060 | 5/1960 | Carter | 198/32 X |
| 3,114,449 | 12/1963 | Bruce | 198/40 |
| 3,273,691 | 9/1966 | Griner | 198/34 |
| 3,353,651 | 11/1967 | Witmer | 198/32 |
| 3,437,189 | 4/1969 | Molins | 198/76 X |
| 3,465,869 | 9/1969 | Benatar | 198/40 X |
| 3,470,996 | 10/1969 | Lee et al. | 198/24 |
| 3,547,251 | 12/1970 | Mernoe | 198/40 |
| 3,650,371 | 3/1972 | Constable | 198/45 |
| 3,669,241 | 6/1972 | Chalich | 198/76 X |
| 3,734,267 | 5/1973 | Tice | 198/30 |
| 3,822,009 | 7/1974 | Richards | 198/37 X |

FOREIGN PATENTS OR APPLICATIONS 2,224,583  12/1972  Germany .......................... 198/37

Primary Examiner—Evon C. Blunk
Assistant Examiner—Richard K. Thomson
Attorney, Agent, or Firm—Ladas, Parry, Von Gehr, Goldsmith & Deschamps

[57] ABSTRACT

A conveyor line between two working stations for objects such as bottles and comprising a single or multi-row buffer section between the discharge conveyor of a preceding working station and the feed conveyor to a subsequent working station and provided with means for currently checking the number of objects present in the buffer section, said means being adapted to adjust the speed of the buffer section conveyor continuously in response to the detected number of objects.

1 Claim, 1 Drawing Figure

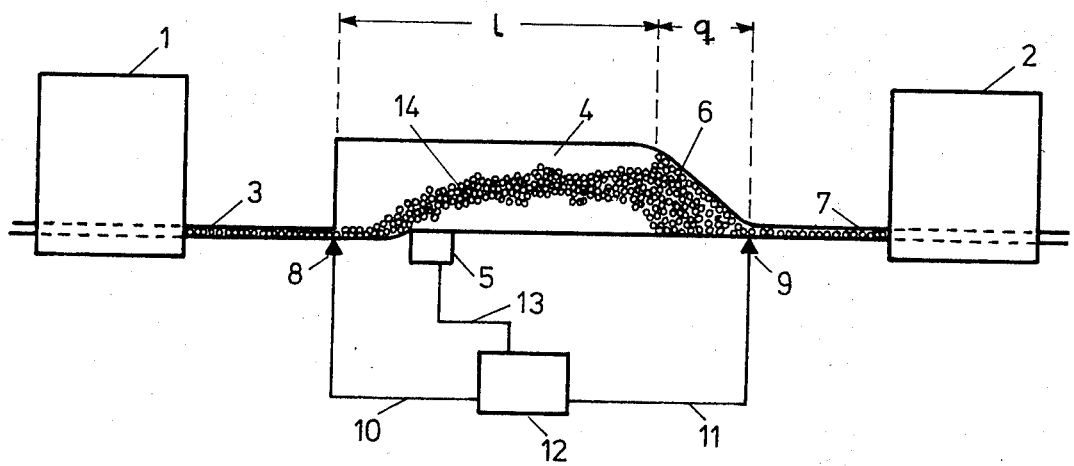

CONVEYOR LINE BETWEEN TWO WORKING STATIONS FOR OBJECTS SUCH AS BOTTLES

This invention relates to a conveyor line between two working stations for objects such as bottles and comprising a single or multi-row buffer section between the discharge conveyor of a preceding working station and the feeding conveyor to a subsequent working station. In such a conveyor line a queue will build up in the buffer section towards the feed conveyor for the following working station and this queue is to be maintained by a constant supply of objects to the buffer section so as to ensure that there will always be a sufficient number of objects to feed the following working station. In this operation it must be taken into account that the performance of the various working stations will always be subject to variations which may cause variation in the number of objects in the buffer section and that consequently it will be desirable to have the highest possible buffer capacity and to ensure that the objects present in the buffer section will be fed constantly to the queue, which will thus be maintained. It has been found, though, that such a conveyor line will cause considerable noise, in particular where it is used for the transport of bottles, and that the noise will arise mainly at the place where the objects advanced in the buffer section strike the front of the said queue. The speed is determined by the travelling speed of the buffer section conveyor, which is usually a relatively smooth belt that can slide under the objects in the queue. To ensure a constant supply of a sufficient number of objects to the queue it has been necessary to operate this conveyor at a relatively high speed, with the result that the objects strike the queue front at high speed too and thus create a high noise level.

It is the aim of the invention to remedy this essential drawback, and that aim has been accomplished according to the invention by providing the conveyor line with means for currently checking the number of objects present in the buffer section and continously adjusting the speed of the buffer section conveyor in response to the detected number of bottles. Thus it has been ensured that the speed of the buffer section conveyor will never exceed the rate necessary for maintaining a constant supply of bottles and thus reduce the noise level to the absolute minimum. Thus the speed is raised only in situations where the number of objects in the buffer section has fallen so much that an extra supply of objects is necessary to reestablish the desired condition in the buffer section.

Means for ascertaining the number of objects passing a given point of a conveyor path are well known and the art also knows apparatus adapted to ascertain the difference between two such measurements, viz. measurements at either end of the buffer section, U.S. Pat. No. 3,547,251, describes such a difference meter which is there used for controlling consecutive working stations, and the said control of the conveyor line between two workng staions could readily be combined with a control of the performances of the working stations as such.

In a particularly expedient embodiment of the conveyor line according to the invention the speed V of the buffer section conveyor is controlled as a function of $$V = \frac{y \cdot l}{x - x_q}$$

wherein $y$ is the normal performance of the preceding working station in number of objects per minute, $x$ is the total number of objects in the buffer section, $x_q$ is the number of objects queued up waiting their turn to be fed to the subsequent working station determined by the normal performance of the subsequent working station and filling out the total width of the buffer section, for a length $q$ thereof, and $l$ is the length in meters of the part of the buffer section extending at any time forward of the queue. The advantage of this construction of the conveyor line is that the buffer section conveyor is caused to operate at any time at no higher speed than is absolutely necessary to reestablish the desired condition in the buffer section, so that the objects advanced in the buffer section will always strike the queue front at the minimum speed, whereby the noise level will be reduced as much as possible, and the reduction of noise thus achieved will be of substantial importance to the persons working in the vicinity of such a conveyor line.

The invention will be explained in greater detail below with reference to the drawing, which is a schematic illustration of a conveyor line between two working stations constructed in accordance with the invention.

The drawing shows a conveyor line connecting a preceding working station 1 and a subsequent working station 2. Working station 1 has a discharge conveyor 3 which is adapted to advance objects in a single row, but which can, theoretically, be adapted to advance several rows of objects. The discharge conveyor 3 leads into a buffer section 4, which is provided in conventional manner with a conveyor that is operated at variable speed by means of a motor 5.

At the exit of the buffer section 4 is provided a restriction 6 to form a queue of objects along a length $q$ of the buffer section 4 from which the objects are led to a feed conveyor 7 for the subsequent working station 2.

Opposite the point where the objects pass from the discharge conveyor 3 into the buffer section 4 is provided a counting device 8 and at the point where the objects are carried from the queue on to the feed conveyor 7 is provided a corresponding counting device 9. The two counting devices are connected by means of leads, 10 and 11 respectively, to a recording means 12 which is adapted to record the difference between the numbers registered by the two counting devices. The record difference is used to adjust the advancing speed of the conveyor of the buffer section, in that the recording means 12 is connected to the motor 5 by means of a lead 13.

The recording means 12 may in theory be of any expedient type, but an arrangement known in the prior art which can be used with advantage involves the use of a counting device at either end of a work station with each of the counting devices being coupled to the primary shaft of a differential, the directions of rotation of the two primary shafts being selected so that a gear wheel coupled to the output gear wheel of the differential will register the difference between the numbers registered by the counters. This difference, as indicated by output of the differential, is, in the prior art, utilized to control a regulation device for the working speed of the preceding and/or the succeeding treating station. In this prior art the arrangement is employed for obtaining the maximum yield in a system comprising a plurality of consecutive processing stations where brief stops may occur. The object of the instant invention, however, is to reduce the noise level as much as possible, but there is nothing to prevent the combination of the illustrated construction of the conveyor line with the control of two consecutive working stations.

To ensure a safe and reliable movement of the objects along the discharge conveyor 3 of the preceding working station 1 it will be expedient to control this station so that the objects travel closely lined up on the discharge conveyor. As soon as the objects enter the buffer section 4 their advance will be effected at the rate determined by the conveyor of the buffer section, and when the whole system is perfectly balanced the objects will be distributed approximately as indicated in the drawing: A buffer stream 14 will be formed wherein the objects are arranged rather irregularly but on the whole quite closely together right to the front of the queue formed on the queue line 6. In this situation the conveyor of the buffer section will travel as slowly as possible to constantly feed the necessary number of objects to the front of the queue, which is thus maintained, but if an irregularity occurs, for instance by the preceding working station performing less than expected, the buffer stream 14 will thin out and there may be a minor interval in the stream, but as soon as working station 1 has regained its full performance and then is adjusted manually or automatically to a slightly increased performance to recover the loss, or the following working station 2 has its performance reduced, there will be a possibility of reestablishing the situation as illustrated, in that the recording means 12 will indicate that there is a smaller number of objects over the entire buffer section and then cause the conveyor of the buffer section to be adjusted to a higher speed, and within a short period of time the buffer stream will again be full. In the same way the buffer stream may increase, and the number of objects in the buffer section rise if the flowing working station 2 operates at reduced performance, and the recording means 12 will then cause the conveyor of the buffer section to reduce its speed until the processing station 2 has regained full normal performance or slightly more, and the situation will then be reestablished as soon as the buffer stream has returned to normal and the predetermined number of objects are present in the buffer section, when the recording means will again cause the conveyor of the buffer section to operate at normal speed. Thus it will be seen that in every situation the conveyor of the buffer section will operate at a speed which is exactly sufficient for advancing the number of objects required for maintaining the queue and thereby the desired pressure against the feed conveyor for the following working station, and as the speed is thus kept as low as possible, the noise caused by collision between the objects will also be reduced as much as possible, which — particularly where the objects are bottles — is of very great importance. It should be noted that the buffer stream itself will constantly be very even and generally relatively close, so that only in case of operational irregularities will there be any essential spreading of the objects over that section and this will not in itself cause any appreciable noise. At the same time the maximum utilization of the buffer section has been achieved so that a relatively large number of objects can be deposited within this section, which is of great importance for the continuous operation.

The invention has been described above in connection with a system which is meant preferably for transport of smaller objects, such as bottles, but it can also be employed for transporting large objects, such as cases, and the buffer section may then be adapted for but a single row of cases, while a conveyor line for bottles will usually, as shown in the drawing, have a wide buffer section.

What I claim is:

1. A conveyor line between two workings stations for objects such as bottles and comprising a single or multi-row buffer section between the discharge conveyor of a preceding working station and the feed conveyor to a subsequent working station and provided with means for currently checking the number of objects present in the buffer section, said means being adapted to adjust the speed of the buffer section conveyor continuously in response to the detected number of objects, wherein the speed V of the buffer section conveyor is controlled as a function of $$V = \frac{y \cdot l}{x - x_q},$$

wherein $y$ is a constant representing the normal performance of the preceding working station in number of objects per minute, $x$ if the total number of objects in the buffer section, $x_q$ is a constant representing the number of objects queued up waiting their turn to be fed to the subsequent working station, determined by the normal performance of the subsequent working station and filling out the total width of the buffer section, and $l$ is a constant representing the length in meters of the part of the buffer section extending forward of the queue, to the minimum speed required to maintain the number of objects in the queue substantially equal to constant $x_q$, thereby minimizing noise caused by collision between objects in the buffer section while ensuring an adequate feed of objects for full performance of said subsequent working station.

* * * * *